United States Patent [19]
Schroder

[11] 3,823,305
[45] July 9, 1974

[54] ARRANGEMENT FOR REGULATING SUPPLY OF HEAT FROM A HEAT ACCUMULATING DEVICE

[75] Inventor: Johann Schroder, Aachen, Germany

[73] Assignee: U.S. Philips Corporation, New York, N.Y.

[22] Filed: June 16, 1972

[21] Appl. No.: 263,673

[30] Foreign Application Priority Data
June 24, 1971  Netherlands............... 7108700

[52] U.S. Cl............... 219/365, 126/400, 165/18, 165/96, 219/341, 219/378, 219/462, 219/530
[51] Int. Cl........ F28f 13/02, F24h 7/04, H05b 1/02
[58] Field of Search........... 219/341, 365, 375, 399, 219/302, 530, 540, 462, 378; 165/18, 96, 104, 135, 136; 126/400, 273.5, 375

[56] References Cited
UNITED STATES PATENTS

| | | | |
|---|---|---|---|
| 1,120,987 | 12/1914 | Vogel | 219/462 |
| 1,146,329 | 7/1915 | Hoock | 219/530 X |
| 1,146,623 | 7/1915 | Hoock | 219/530 |
| 1,870,684 | 8/1932 | Killeffer | 165/96 UX |
| 2,066,127 | 12/1936 | Slayter | 219/341 |
| 3,007,596 | 11/1961 | Matsch | 165/136 |
| 3,167,159 | 1/1965 | Bovenkerk | 165/96 X |
| 3,227,208 | 1/1966 | Potter et al. | 219/378 UX |
| 3,270,802 | 9/1966 | Lindberg | 165/96 X |
| 3,450,196 | 6/1969 | Bauer | 165/32 |
| 3,569,669 | 3/1971 | March | 219/530 X |

FOREIGN PATENTS OR APPLICATIONS

| | | | |
|---|---|---|---|
| 870,340 | 6/1961 | Great Britain | 219/341 |
| 875,584 | 6/1942 | France | 219/462 |

Primary Examiner—A. Bartis
Attorney, Agent, or Firm—Frank R. Trifari

[57] ABSTRACT

A heat accumulating device includes a double-walled reservoir filled with a material suitable for storing heat and provided with heating means for heating the material. The free space bounded by the double walls of the reservoir accomodates a plurality of foil radiation screens and the free space is further filled with a hydrogen atmosphere. The hydrogen filled free space is in communication with a reservoir containing a thermally reversible hydrogen getter. By regulation of the temperature of the hydrogen getter by means of an electric heater associated therewith, the hydrogen pressure in the free space and hence thermal conductivity of the free space is controlled whereby the transfer of heat through the walls of the reservoir from the heat storage material is readily regulated. Means may be provided to effect the supply of heat from the reservoir to the surrounding ambient by forced convection. The free space may be divided into a plurality of compartments completely separated from each other with each compartment being communicating with a separate thermally reversible getter whereby discharge of heat from different portions of the reservoir can be separately regulated.

8 Claims, 3 Drawing Figures

ARRANGEMENT FOR REGULATING SUPPLY OF HEAT FROM A HEAT ACCUMULATING DEVICE

BACKGROUND OF THE INVENTION

The invention relates to a heating device provided with a heat accumulator, one or more heating elements whose supplied heat can be stored in the heat accumulator and means for the regulated supply of heat by the heat accumulator directly or by means of a heat-transporting medium to the ambient or to a device using heat.

An example of such a heating device is a heat accumulating oven. Mainly two types of ovens of this kind are commercially available, namely a type in which the supply of heat by the heat accumulator to the ambient is effected by radiation and natural convection and a type in which the heat is supplied by forced convection. In the first type there is no real possibility to regulate the supply of heat from the heat accumulator to the ambient. In the second type a heat-transporting medium, for example, air is blown through ducts in the heat accumulator with the aid of a fan. The supply of heat is regulated by the rotational speed of the fan, that is to say, by the flow rate of the air. By admixing to a greater or lesser extent unheated air to the hot air, the temperature of the emerging air may be regulated. The temperature and the flow rate of the emerging air must not exceed given prescribed values. When proportioning the regulating members, the varying temperature difference between the heat accumulator and the heat-transporting medium to be brought in heat-exchanging contact with the storage accumulator during the emission of heat is to be taken into account. In practice, the temperature, of the heat accumulator generally decreases in such a manner that per unit of time a decreasing quantity of heat is supplied to the same quantity of heat-transporting medium passed through the heater. On the other hand it must be possible to regulate the supply of heat to the ambient as a function of the ambient temperature. It is obvious that complicated regulating members are necessary in the latter type of oven.

The heat accumulator in both types of ovens is provided with an insulation of solid materials, such as porous ceramic material. In the first type of oven, the insulation casing is generally proportioned in such a manner that the heat stored during the night is supplied to the ambience during the subsequent 10 to 15 hours. The heat supplied per unit of time then decreases as the temperature of the storage material decreases. The second type of oven is generally provided with an insulation casing proportioned in such a manner that in case of a stationary fan half of the stored heat is given off within approximately 15 hours. In such an oven the volume of the insulation material may be approximately half that of the total oven volume.

Since the heat losses are inversely proportional to the thickness of the insulation casing a reduction of these losses may require an even larger thickness of the insulation casing and thus cause an enlargement of the oven volume more than proportional thereto.

SUMMARY OF THE INVENTION

The object of the invention is to provide a possibility of improving the insulation quality and thereby to reduce the volume of the oven and to reduce the unwanted heat losses and simultaneously simplifying the regulation of the supply of heat to the ambient. A further object is to render a simple regulation of the supply of heat possible in the first-mentioned type of oven in which the supply of heat to the ambient is effected by radiation and natural convection.

To this end the invention provides a heating device which is characterized in that the heat accumulator comprises a reservoir shut off from the ambient and containing a material suitable for storing heat, which reservoir is provided with double walls, while the free space bounded by the double walls of the reservoir accommodates one or more radiation screens, which free space further comprises a hydrogen atmosphere whose pressure is regulated by the temperature of a reservoir containing a reversible hydrogen getter and being provided with a controllable heating element, which reservoir is in communication with said space.

The invention is based on the recognition of the fact that considerable advantages relative to the existing devices can be obtained by accommodating the heat storing material in a reservoir provided with an integral heat insulation consisting of radiation screens which are present in a space which can be evacuated, in practice sometimes referred to as "superinsulation" and by regulating the transfer of heat from the storage heater to the heat-transporting medium or the ambiance.

By using the so-called superinsulation a heating device of smaller weight and volume for the same storage capacity is obtained than when using the conventional heat insulating materials.

In the existing devices the insulation generally consists of porous ceramic material. The wall thickness of this insulation is to be chosen to be larger as the temperature of the heat-storing material is higher.

In the existing devices employing forced convection heat is also be lost by natural convection and radiation, as already described, in the stationary state, that is to say, when the forced convection is switched off. This is always the case for those devices in which the supply of heat can be effected in this manner only.

When using a so-called superinsulation only very little heat is lost by radiation, convection or conduction in the stationary state if the radiation screens are present in a vacuum.

The radiation screens may consist of thin foils which at least superficially consist of a material having a satisfactory reflective capacity for thermal radiation such as copper, nickel, aluminium, silver, gold, lanthanum hexaboride and the like.

According to the invention the radiation screens are present in a hydrogen atmosphere whose pressure is controllable. To this end the space accommodating the radiation screens is connected to a reservoir containing a reversible hydrogen getter.

In this connection the use of partially hydrogenated hydrogen getters has the advantage that the part of the metal not saturated with hydrogen may getter residual gases in the system, for example, oxygen, carbon monoxide and nitrogen to 1,000°C without the hydrogen-metal equilibrium being essentially influenced. In addition, the variation of the hydrogen dissociation pressure with the temperature may be chosen arbitrarily within wide limits by means of the hydrogenation degree because the hydrogen pressure over the metal hydride is both a function of the temperature and of the hydrogen concentration in the metal.

Partially hydrogenated reversible hydrogen getters may be metals from the group formed by titanium, zirconium, hafnium, lanthanum, cerium and other rare earth metals, strontium, barium vanadium, niobium, tantalum, thorium and alloys and mixtures of these metals in a partially hydrogenated state. The hydrogen dissociation pressure of the hydrides of these metals varies at temperatures of between 25°C and 800°C between less than $10^{-3}$ Torr and approximately $10^2$ Torr. Titanium, zirconium and hafnium in a partially hydrogenated state have been found to be very suitable for the relevant case.

The getters may be used as fine powders or in the form of moulded porous mouldings. To prevent a decrease in the active surface of the getter and sintering of the getter particles, the getter may be mixed with a powder of a refractory metal such as tungsten or molybdenum.

In order to evacuate an insulation space having a volume of several litres or fill it with hydrogen to a pressure of approximately 100 Torr, approximately 5 to 50 grams of metal hydride are required as a function of the molecular weight. The metals may be obtained in a partially hydrogenated state by extracting part of the dissolved hydrogen (5 to 60 percent by weight) at an elevated temperature (for zirconium hydride, for example, between 200° and 700°C,) while starting from metal hydride saturated with hydrogen by pumping off the hydrogen in equilibrium with the getter material.

As compared with other gases hydrogen has the greatest thermal conductivity. Below a given pressure, namely the pressure at which the average free length of the path of the hydrogen molecules is of the same order as the distance between the radiation screens, the thermal conductance from radiation screen to radiation screen is a function of the hydrogen pressure. For a distance of 0.1 mm between two radiation screens and a temperature difference of 700° (725°C - 25°C) the thermal conductance is approximately 200W/sq. cm, at a hydrogen pressure of approximately 10 Torr, and the thermal conductance is approximately $4.10^{-4}$ W/sq.cm at a pressure of approximately $10^{-3}$ Torr.

The volume of the heat insulation is relatively small as compared with the total volume of a heating device according to the invention, and as compared with existing devices it has a slight weight.

The total quantity of hydrogen in the system is proportioned in such a manner that for the normal ambient temperature the hydrogen pressure in the system is $10^{-3}$ Torr or less. Under these circumstances the thermal conductance through the heat accumulator to the ambient is extremely small. If supply of heat is desired, the getter is heated to a temperature at which the hydrogen pressure in the system has reached a value at which the desired thermal conductance is obtained.

The heat transported by means of hydrogen from the storage material to the outer wall of the insulation casing may directly be supplied to the ambient, for example, by radiation or natural convection. However, the heat may alternatively be transported from the outer wall of the insulation casing to the ambient or to a heat-using device by means of a heat-transporting medium, such as air or water.

The advantage of the heating device according to the invention, as compared with the existing heating devices, is particularly that the temperature of the outer wall of the insulation casing and hence the temperature of a heat transporting medium optionally used can directly be controlled by regulating the supply of heat from the heat accumulator to the heat-transporting medium by means of the hydrogen pressure in the insulation casing.

As a result, for example, complicated control devices for mixing unheated heat-transporting medium with hot heat-transporting medium need not be used.

In a device according to the invention, employing forced convection, the heat-transporting medium may be passed through the device at a constant rate, so that fans and pumps can operate at a constant speed.

The heating devices according to the invention have the additional advantage that the space accommodating the radiation screens may be subdivided into two or more compartments separated from each other which are each in communication with their own reservoir provided with a controllable heating element and containing a reversible hydrogen getter. The heating device may be arranged in such a manner that heat can be supplied to the ambient both by direct radiation and conduction and by forced convection.

In the existing heating devices employing forced convection the heat accumulator consists of a plurality of blocks of high-melting point material optionally provided with apertures which blocks are stacked in such a manner that ducts are brought about through which the heat-transporting medium can be blown or pumped. Due to the different structure of the heating devices according to the invention in which the heat-storing material is present in a reservoir shut off from the outside world the possibility is created to store heat at temperatures above the melting point of the heat-storing material. Since a relatively large quantity of heat in the form of latent heat of fusion as compared with the capacitively stored heat can be stored, the use of this principle makes it possible to have a smaller quantity of heat-storing material at the prescribed thermal capacity and at the same maximum temperature than is possible with materials in which the heat to be stored can only be fixed capacitively.

In the heating devices according to the invention it is advantageous to use materials or mixtures of materials having a melting point of between 400° and 850°C. Particularly suitable as heat-storing materials are, for example, lithium fluoride and eutectic mixtures of metal fluorides, such as of lithium fluoride, sodium fluoride, potassium fluoride, calcium fluoride, magnesium fluoride having eutectic melting points in the range of from 600° to 850°C.

The invention will be further described with reference to the following embodiment and to the drawings.

DESCRIPTION OF THE PREFERRED EMBODIMENT

Figure 1:
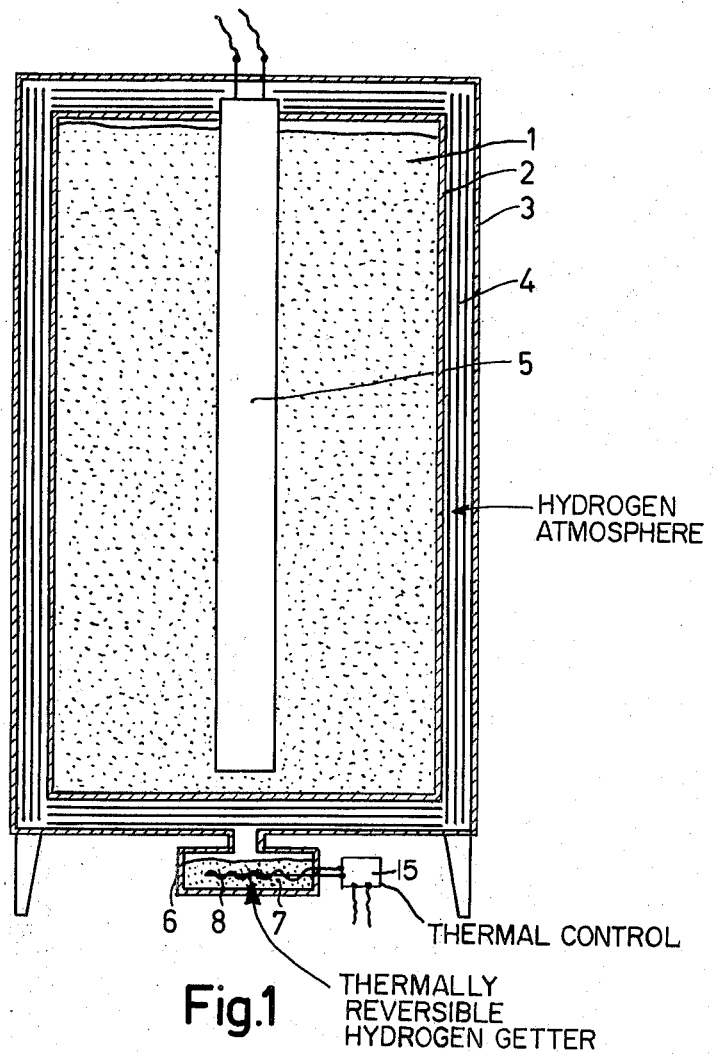
FIG. 1 diagrammatically shows in a cross-section a heating device for direct radiation and natural convection, FIG. 2 diagrammatically shows in a cross-section a heating device for forced convection, and FIG. 3 diagrammatically shows in a cross-section a heating device for radiation and natural convection in which the free space between the wall of the reservoir and the outer casing splitt up into two compartments separated from each other.

The device according to FIG. 1 comprises a heat-storing material 1, for example, lithium fluoride in a closed reservoir 2 of steel. This reservoir 2 is surrounded, with an interspace, by the outer casing 3 likewise of steel. A plurality of radiation screens 4, for example, of copper foil, which are mutually spaced by spacers not shown and are spaced from the reservoir and the outer casing 3 are provided between the wall of reservoir 2 and the outer casing 3. The reservoir 2 includes an electric heating element 5 provided with a steel casing. The space in which the radiation screens 4 are present is in communication with the auxiliary reservoir 6 in which partially hydrogenated zirconium 7 is present. Reservoir 6 is provided with an electric heating element 8.

The operation of the device according to FIG. 1 is as follows: the heat storing material 1 is heated by means of the heating element 5, optionally to above the melting point. This heating is preferably effected during a period when heat is in small demand for example during the night, when electrical energy can sometimes be obtained at lower cost. After the heat-storing material has reached the desired temperature, the electrical current is switched off. All this may be controlled in a simple manner by means of a thermostat (not shown). The temperature in the auxiliary reservoir 6 is equal to the ambient temperature which is usually between 10° and 25°C so that the pressure of hydrogen in the space accommodating the radiation screens is less than $10^{-3}$ Torr. When heat is to be supplied to the ambient by the device, the partially hydrogenated zirconium 7 in reservoir 6 is heated by means of the electrical heating element 8 to a temperature at which the hydrogen pressure in the space between the reservoir 2 and the outer casing 3 is of such a nature that a thermal conductance which is sufficient for the desired supply of heat occurs. All this may be controlled, for example, by switching off the heating element 8 at a previously fixed maximum temperature of the outer casing 3 and by switching it on again when this temperature has decreased by several degrees, for example, by a thermostat 15.

For a volume of 2.2 litres of the free space between the reservoir 2 and the outer casing 3, approximately 12.5 g of partially hydrogenated zirconium may be sufficient for the control of the hydrogen pressure between approximately $10^{-4}$ Torr at a temperature of less than 100°C of the partially hydrogenated zirconium hydride 7 and approximately 10 Torr at a temperature of 550°C of the partially hydrogenated zirconium. This quantity of partially hydrogenated zirconium may be obtained by extracting 500 ml of hydrogen of 760 Torr and 20°C from 12.5 g of zirconium hydride saturated with hydrogen.

Figure 2:
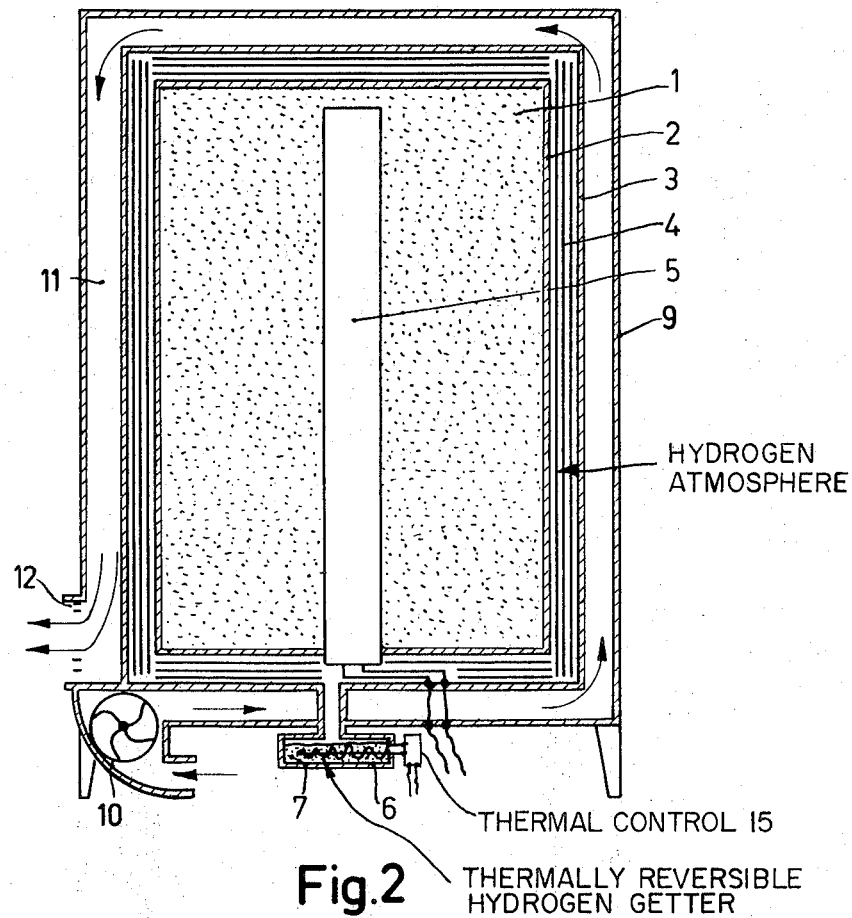

The device according to FIG. 2 is intended for forced convection. In principle the device consists of a device according to FIG. 1 (same reference numerals have the same significance) which is spatially surrounded by a casing 9 of steel. Furthermore a fan 10 and an aperture 12 are present in the casing 9. Heat is stored in the heat-storing material 1 in the same manner as described with reference to the device according to FIG. 1.

When heat is to be taken off by forced convection, the casing 3 of the reservoir is brought to the desired temperature and maintained at this temperature by regulating the hydrogen pressure in the previously described manner and air is circulated in the space 11 between the casings 3 and 8 by means of the fan 10 which rotates at a constant speed. The hot air is blown at 12 into the space to be heated.

Figure 3:
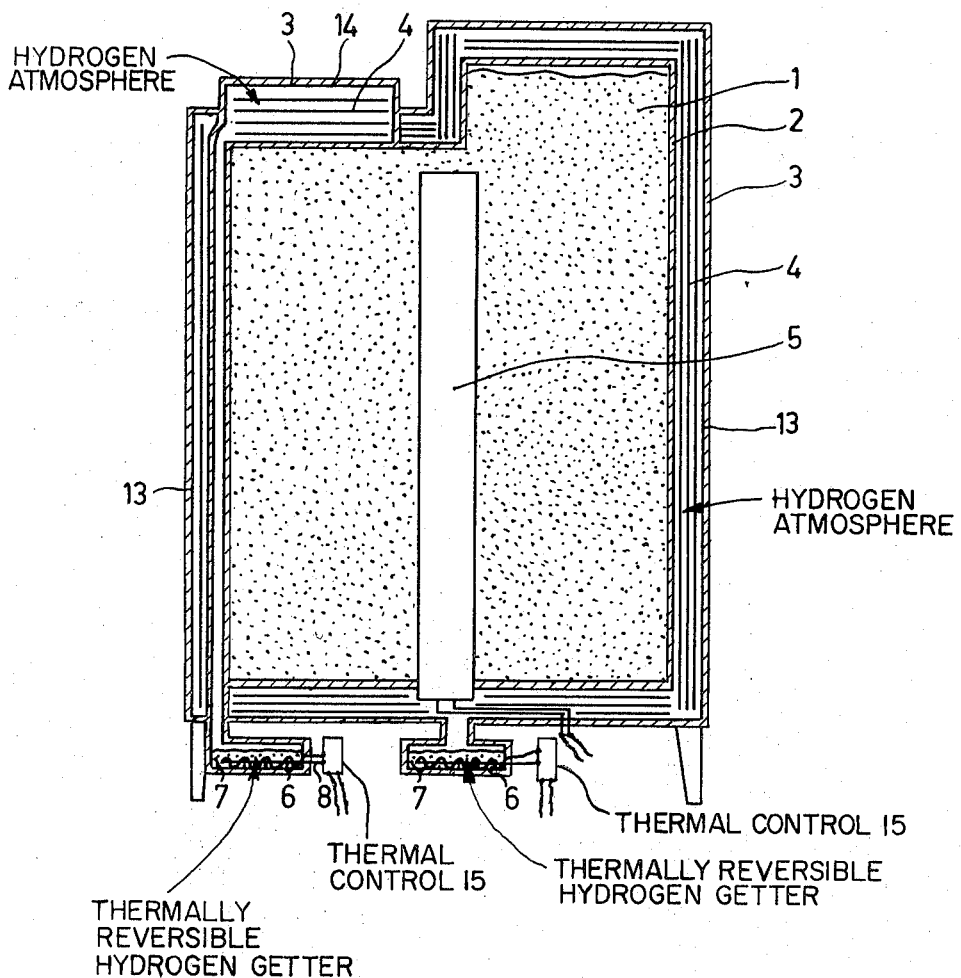

The device according to FIG. 3 differs from the device of FIG. 1 only in that the space bounded by the walls 2 and 3 consists of two compartments 13 and 14 each having their own reservoir 6 each containing a reversible hydrogen getter 7. This makes it possible to utilize the part 14, for example, for cooking purposes without the part 13 of the device being used for heating the space. It is of course possible to provide part 13 with an extra casing as is shown in the device according to FIG. 2 and, if desired, to take up heat from this part by means of forced convection.

What is claimed is:

1. A heating device formed as a heat accumulator comprising a reservoir whose walls define a closed space, an outer casing whose walls surround the reservoir and define an interspace therebetween, a heat storage material within said reservoir, means within said reservoir for heating said material, radiation screen means situated in said interspace and surrounding the reservoir to inhibit radiant heat transfer across said interspace from said reservoir walls to said casing, a hydrogen atmosphere in said interspace for enveloping said radiation screen means, an auxiliary reservoir external of the casing and and defining an auxiliary space therein in open communication with said interspace, a thermally reversible hydrogen getter in said auxiliary space, and second heating means in said auxiliary space for heating said getter and means for controlling the second heating means for regulating the getter temperature to thereby selectively control the concentration of hydrogen in the interspace, whereby said second heating means is operable to heat the hydrogen getter to release hydrogen thereby increasing the hydrogen atmosphere pressure in said interspace so that the heat is more readily discharged.

2. A heating device as claimed in claim 1, operable with a heat transporting medium, and further comprising means for bringing said heat-transporting medium into heat exchanging contact with the outer surface of said casing.

3. A heating device as claimed in claim 1 characterized in that said interspace is divided into at least two compartments completely separated from each other, said auxiliary reservoir operable with one of said compartments, the device further comprising a second auxiliary reservoir similar to the first in including a hydrogen getter, a heating means for heating said getter and control means for regulating the getter temperature, said second auxiliary reservoir being in communication with the other compartment.

4. A heating device as claimed in claim 1, characterized in that the heat-storing material consists of a material having a melting point of between approximately 600° and 850°C.

5. A heating device as claimed in claim 1, characterized in that the quantity of hydrogen-gettering material in said getter and the hydrogen concentration in said interspace is proportioned in such a manner that, as a function of the temperature of the getter, a hydrogen pressure in the order of 100 to $10^{-3}$ Torr can be obtained in the interspace.

6. A heating device as claimed in claim 1, characterized in that the reversible hydrogen getter consists of a metal from the group consisting of titanium, zirconium, hafnium, lanthanum, cerium and other rare earth metals, strontium, barium, vanadium, niobium, tantalum, thorium and alloys and mixtures of these metals in a partially hydrogenated state.

7. A heating device as claimed in claim 1 in which the reversible hydrogen getter is present as a mixture with a powder of a refractory metal.

8. Apparatus according to claim 1, further comprising an outer casing surrounding the device and defining an interspace therebetween, said outer casing including an inlet and an outlet, the apparatus further comprising means for forcing a heat transporting fluid to flow through said interspace from said inlet to said outlet.

* * * * *